United States Patent
Wang et al.

(10) Patent No.: US 10,621,752 B2
(45) Date of Patent: Apr. 14, 2020

(54) METHODS AND SYSTEMS FOR CAMERA CALIBRATION

(71) Applicant: Shanghai Zhaoxin Semiconductor Co., Ltd., Shanghai (CN)

(72) Inventors: Xu Wang, Beijing (CN); Feifei Yang, Beijing (CN); Yalong Jiang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 100 days.

(21) Appl. No.: 15/810,765

(22) Filed: Nov. 13, 2017

(65) Prior Publication Data
US 2019/0005680 A1    Jan. 3, 2019

(30) Foreign Application Priority Data
Jun. 30, 2017 (CN) .......................... 2017 1 0524710

(51) Int. Cl.
*H04N 5/225* (2006.01)
*H04N 17/00* (2006.01)
(Continued)

(52) U.S. Cl.
CPC ................ *G06T 7/80* (2017.01); *G06T 5/006* (2013.01); *G06T 7/50* (2017.01); *H04N 5/3572* (2013.01);
(Continued)

(58) Field of Classification Search
CPC .. G06T 7/80; G06T 5/006; G06T 5/20; G06T 2207/20164
(Continued)

(56) References Cited

U.S. PATENT DOCUMENTS

| | | | |
|---|---|---|---|
| 2015/0093042 A1* | 4/2015 | Zhu | G06T 5/006 382/275 |
| 2016/0300334 A1 | 10/2016 | Chen | |
| 2018/0122099 A1* | 5/2018 | Lee | G06T 3/00 |

FOREIGN PATENT DOCUMENTS

| | | |
|---|---|---|
| CN | 101064780 A | 10/2007 |
| CN | 104657940 A | 5/2015 |
| CN | 105844276 A | 8/2016 |

OTHER PUBLICATIONS

Hartley, R., et al.; "Parameter-Free Radial Distortion Correction with Center of Distortion Estimation;" IEEE Transactions on Pattern Analysis and Machine Intelligence; vol. 29; No. 8; Aug. 2007; pp. 1309-1321.

(Continued)

*Primary Examiner* — Jefferey F Harold
*Assistant Examiner* — Jean W Desir
(74) *Attorney, Agent, or Firm* — McClure, Qualey & Rodack, LLP

(57) ABSTRACT

A method for camera calibration, performed by a processing unit, at least contains: controlling a camera module to obtain a shooting image with a distortion; generating reference position information of a plurality of pixels of the shooting image, wherein the reference position information includes position information of the plurality of pixels after eliminating the distortion; storing the reference position information in a lookup table, wherein the lookup table contains entries and each entry stores reference position of one pixel; and adjusting an output from the camera module by using the lookup table.

27 Claims, 8 Drawing Sheets

(51) Int. Cl.
  *G06T 7/80* (2017.01)
  *G06T 5/00* (2006.01)
  *G06T 7/50* (2017.01)
  *H04N 5/357* (2011.01)
  *G06T 7/73* (2017.01)
  *G06T 5/20* (2006.01)
  *G06T 7/00* (2017.01)

(52) U.S. Cl.
  CPC .............. *G06T 5/20* (2013.01); *G06T 7/0004* (2013.01); *G06T 7/73* (2017.01); *G06T 2207/20164* (2013.01); *G06T 2207/30168* (2013.01)

(58) Field of Classification Search
  USPC .......................... 348/175, 187, 188, 189, 180
  See application file for complete search history.

(56) References Cited

OTHER PUBLICATIONS

Huang, Y., et al.; "Fisheye distortion chessboard images correction;" Computer Engineering and Applications; Dec. 2014; pp. 111-114. Translation of abstract of "Fisheye distortion chessboard images correction."

* cited by examiner

| Case 1 | Case 2 | Case 3 | Case 4 |

FIG. 10

METHODS AND SYSTEMS FOR CAMERA CALIBRATION

CROSS REFERENCE TO RELATED APPLICATIONS

This application claims the benefit of China Patent Application No. 201710524710.8, filed on Jun. 30, 2017, the entirety of which is incorporated by reference herein.

BACKGROUND

Technical Field

The present invention relates to image processing, and in particular, it relates to methods for camera calibration.

Description of the Related Art

In photography, there are several advantages by using lenses. For example, the use of lenses can increase the amount of light that may enter camera sensors, and reduce the exposure time. However, the use of lenses can also lead to a nonlinear distortion to the image generate by lenses. Generally, the nonlinear distortion includes a radial distortion and a tangent distortion. Thus, methods for camera calibration are introduced to reduce the nonlinear distortions to the image.

BRIEF SUMMARY

An embodiment of a method for camera calibration, performed by a processing unit, comprises: controlling a camera module to obtain a shooting image with a distortion; generating reference position information of a plurality of pixels of the shooting image, wherein the reference position information includes position information of the plurality of pixels after eliminating the distortion; storing the reference position information in a lookup table; and adjusting an output of the camera module by using the lookup table. The lookup table contains a plurality of entries and each entry stores reference position of one pixel.

Another embodiment of a method for camera calibration, performed by a processing unit, comprises: controlling a camera module to obtain a shooting image with a distortion; determining a plurality of corners of the shooting image according to pixels of the shooting image; determining a best parameter set of the camera module according to information about the corners; determining maximum likelihood coordinates of the plurality of pixels after eliminating the distortion according to best parameter set and a distortion center; and adjusting an output from the camera module according to the maximum likelihood coordinates.

Still another embodiment of a method for camera calibration, performed by a processing unit, comprises: controlling a camera module to obtain a shooting image with a distortion; determining corners of the shooting image according to pixels of the shooting image; determines best parameter set of the camera module according to information about the corners; and adjusting an output from the camera module according to the best parameter set. The best parameter set is a set of parameters to minimize an energy function.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein:

Figure 10:
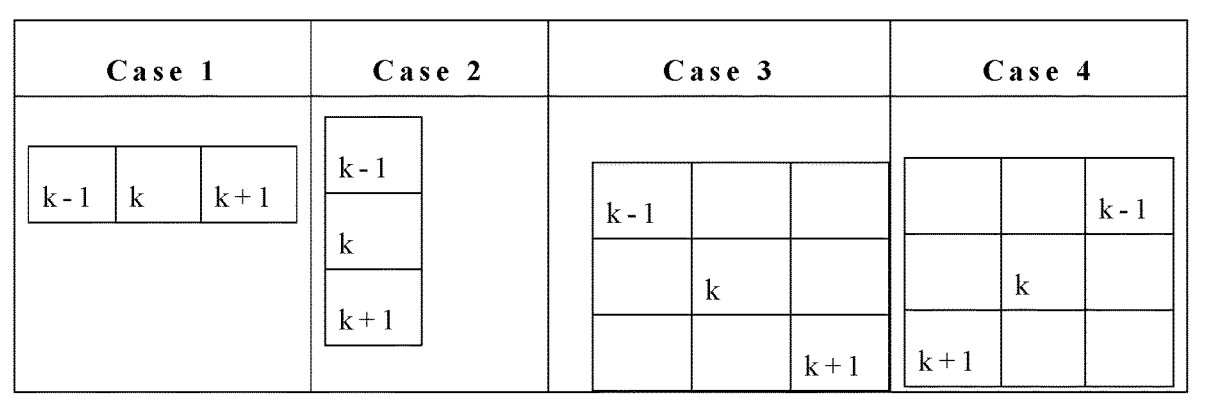

FIG. 10 is a table showing exemplary cases of successive corners referenced in connection with FIG. 5.

DETAILED DESCRIPTION

The following description is of the best-contemplated mode of carrying out the invention. This description is made for the purpose of illustrating the general principles of the invention and should not be taken into a limitation. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
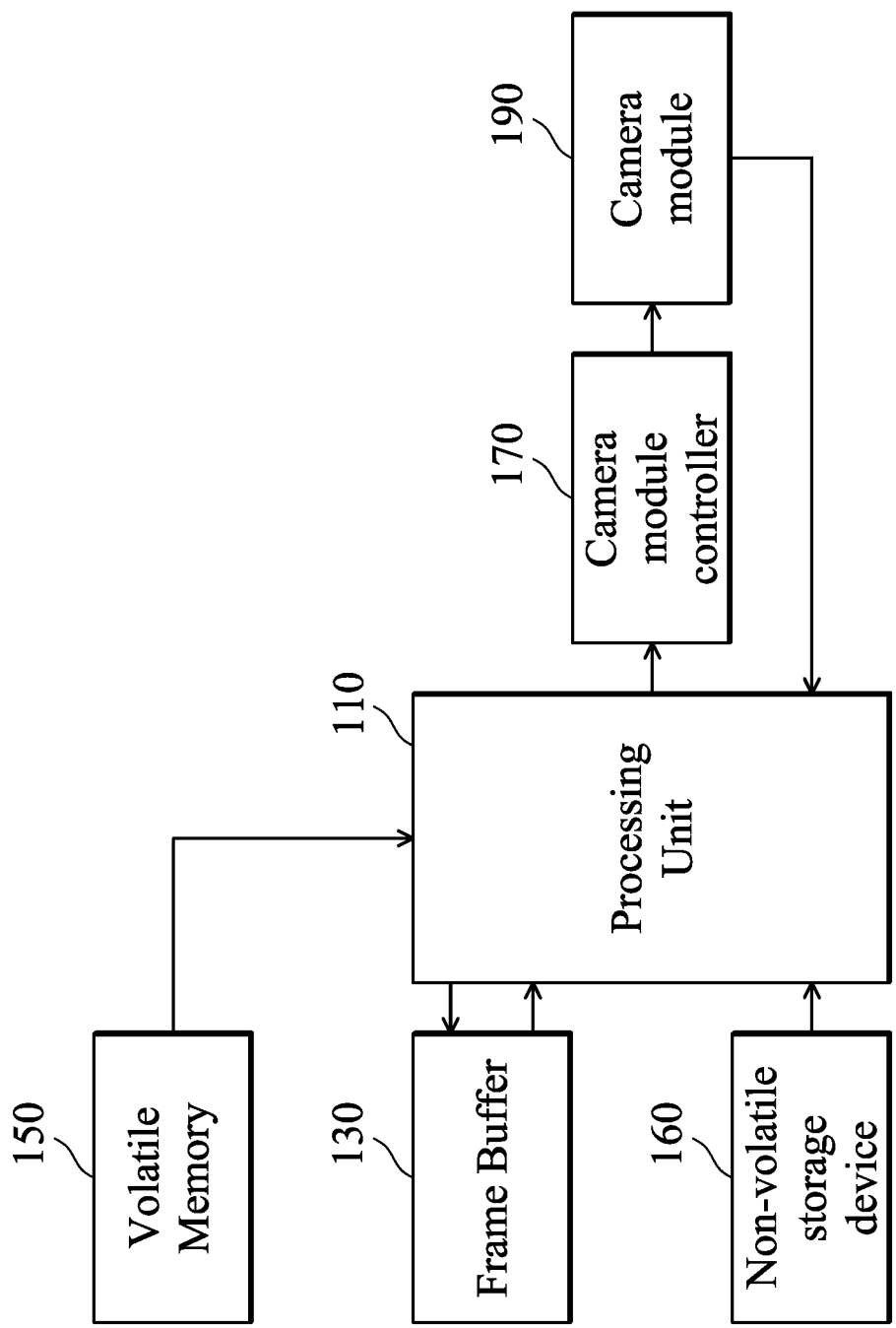
FIG. 1 is a schematic diagram illustrating the architecture of a computer system according to an embodiment of the invention.

FIG. 1 is a schematic diagram illustrating the architecture of a computer system according to an embodiment of the invention. The architecture may be implemented in a desktop computer, a notebook computer, a tablet PC (personal computer), a mobile phone, a digital camera, a digital recorder, or another device which contains at least a processing unit 110. The processing unit 110 can be implemented in numerous ways, such as with dedicated hardware, or with general-purpose hardware (e.g., a single processor, multiple processors or graphics processing units capable of parallel computation, or others) that is programmed using firmware or software instructions to perform the functions recited herein. The processing unit 110 may be embedded in an ISP (Image Signal Processor) and drive a camera module controller 170 to control a camera module 190 for capturing a shooting image. The camera module 190 may comprise image sensor, such as CMOS (complementary metal-oxide-semiconductor) sensor or CCD (charge-coupled device)

sensor, to capture the shooting image by sensing lights of a red, green and blue color, and readout electronic circuits for collecting the sensed data from the image sensors. The volatile memory 150, such as a DRAM (Dynamic Random Access Memory), for storing necessary data for camera calibration, such as variables, data tables, etc.

Figure 2:
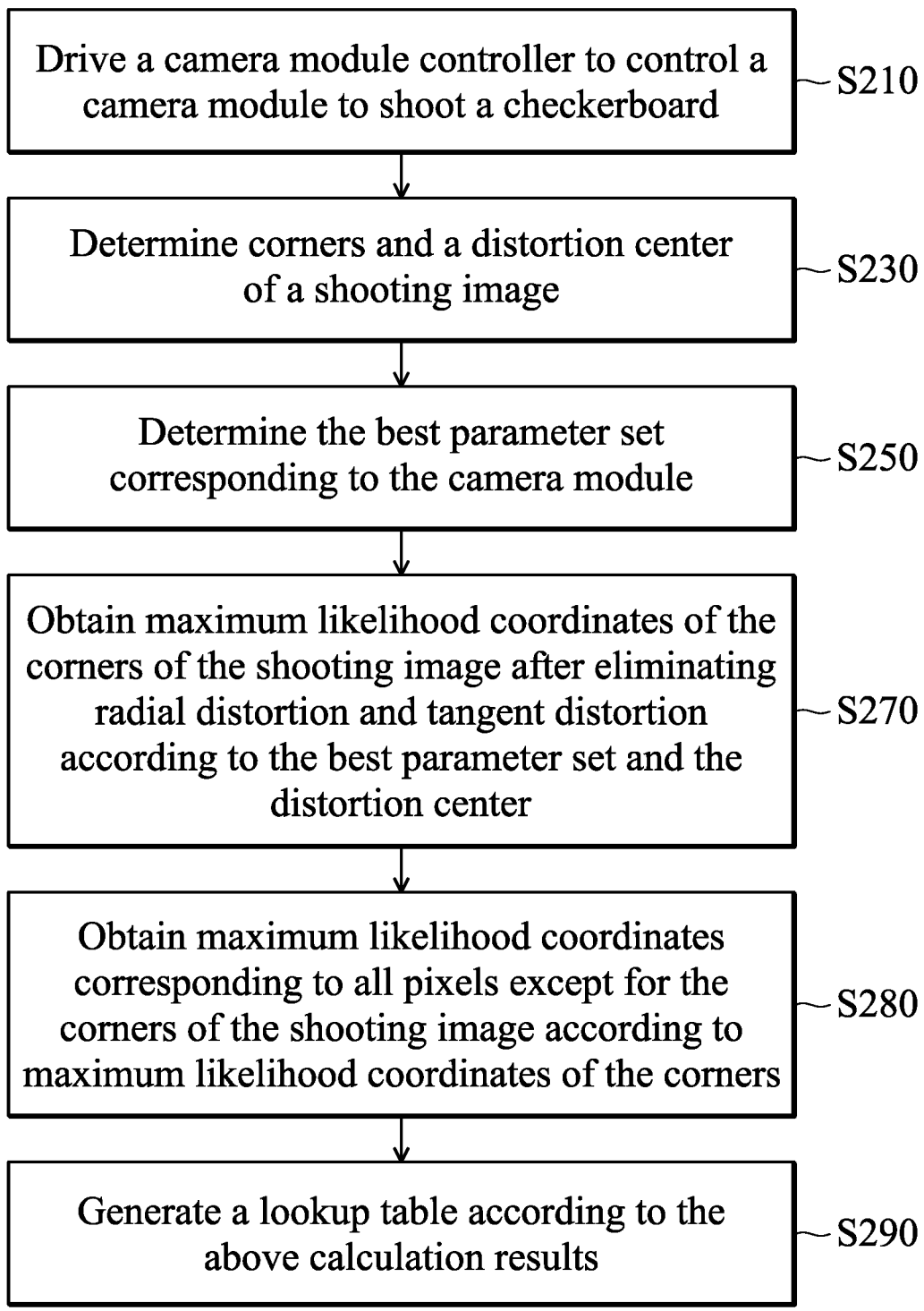
FIG. 2 is a flowchart illustrating a method for calibrating camera according to an embodiment of the invention.
Figure 3:
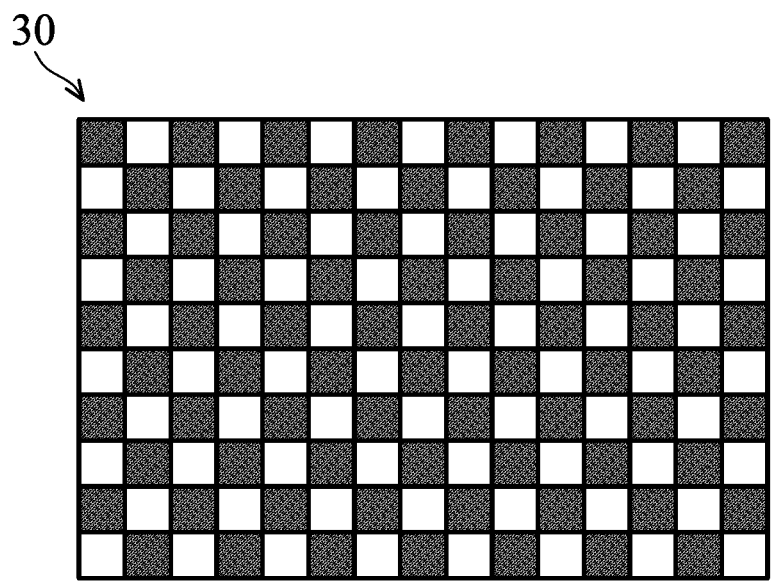
FIG. 3 is a schematic diagram of a checkerboard according to an embodiment of the invention.
Figure 4:
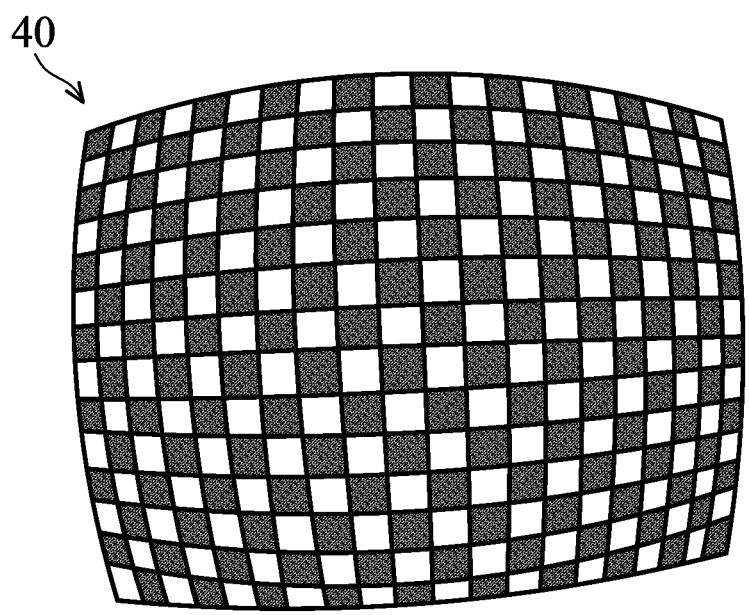
FIG. 4 is a schematic diagram of a shooting image according to an embodiment of the invention.

FIG. 2 is a flowchart illustrating a method for calibrating camera according to an embodiment of the invention. The method is performed by the processing unit 110 when loading and executing relevant hardware, firmware and/or software instructions. FIG. 3 is a schematic diagram of a checkerboard according to an embodiment of the invention. For calibrating an image captured by the camera module 190, an embodiment of the invention provides a checkerboard 30, which may look like a chess board. In some embodiments, the length and/or the width of a checkerboard may be modified. Preferably, the size of the checkerboard is set to enable the camera sensor to sense light reflected from the whole checkerboard through the lens. Before the camera module 190 leaves the factory, the processing unit 110 drives the camera module controller 170 to control the camera module 190 to shoot the checkerboard 30, enabling the camera module 190 to capture a shooting image and storing the shooting image in a frame buffer 130 (step S210). FIG. 4 is a schematic diagram of a shooting image according to an embodiment of the invention. The image sensors generate the shooting image 40 by sensing the light through the lens of the camera module 190. The shooting image 40 is an image of the checkerboard with radial distortion and tangent distortion. Radial distortion may be caused by the shape of lens of the camera module 190, resulting that the light through a position farther away from the center of the lens is more inward bended than that through the nearer position. Tangent distortion may be caused by a bias in assembling of the camera module 190 when the lens is not placed in parallel with the image sensors.

In order to adjust an output of the camera module 190, the processing unit 110 determines a plurality of corners and a distortion center $(x_e, y_e)$ of the shooting image 40 (step S230), determines the best parameter set $\hat{\alpha}$ and $\hat{\beta}$ corresponding to the camera module 190 (step S250), obtaining maximum likelihood coordinates $P_{u,v}^{UnDis}$ of the corners of the shooting image 40 after eliminating radial distortion and tangent distortion according to the best parameter set $\hat{\alpha}$ and $\hat{\beta}$ and the distortion center $(x_e, y_e)$ (step S270) and obtaining maximum likelihood coordinates $P_{u,v}^{UnDis}$ of all pixels (except the corners which have been obtained) of the shooting image 40 according to maximum likelihood coordinates $P_{u,v}^{UnDis}$ of the corners (step S280) and generating a lookup table according to the above calculation results, which may be stored in a non-volatile storage device 160 (step S290).

Figure 5:
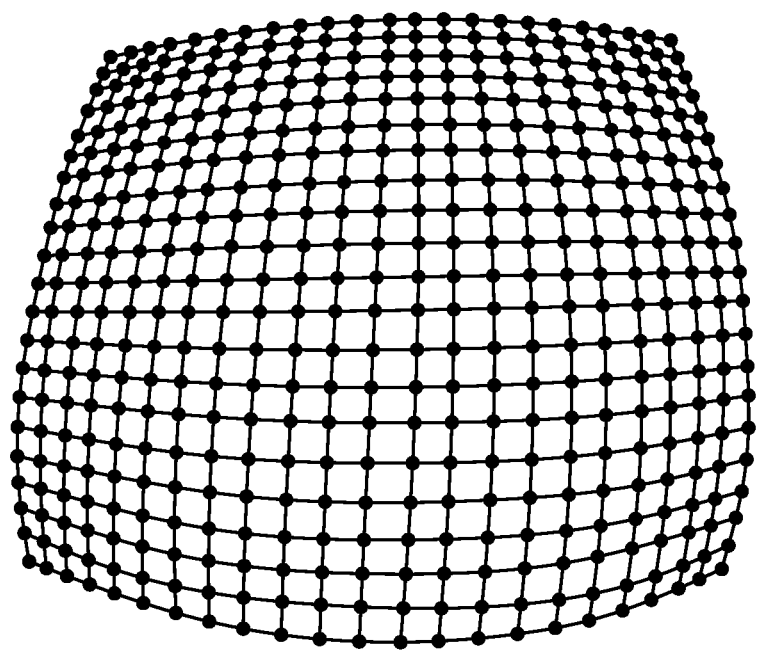
FIG. 5 is a schematic diagram of corners according to an embodiment of the invention.

In step S230, a corner may be an extreme pixel, that is, a pixel has a specified attribute significantly different from that of surrounding pixels. A corner may be defined as the intersection of two edges or a point situated in adjacent objects in two directions. FIG. 5 is a schematic diagram of corners according to an embodiment of the invention. Each corner is the intersection of two edges (an example as shown in FIG. 5) when a shooting image (an example as shown in FIG. 4) is obtained through shooting a checkerboard. Those skilled in the art may apply well-known methods to determine the corners and the distortion center $(x_e, y_e)$. For example, Richard Hartley and Sing Bing Kang (August 2007) '*Parameter-Free Radial Distortion Correction with Center of Distortion Estimation*'. *IEEE Transactions on Pattern Analysis and Machine Intelligence*. Vol. 29, No. 8, pages 1309-1321.

Figure 6:
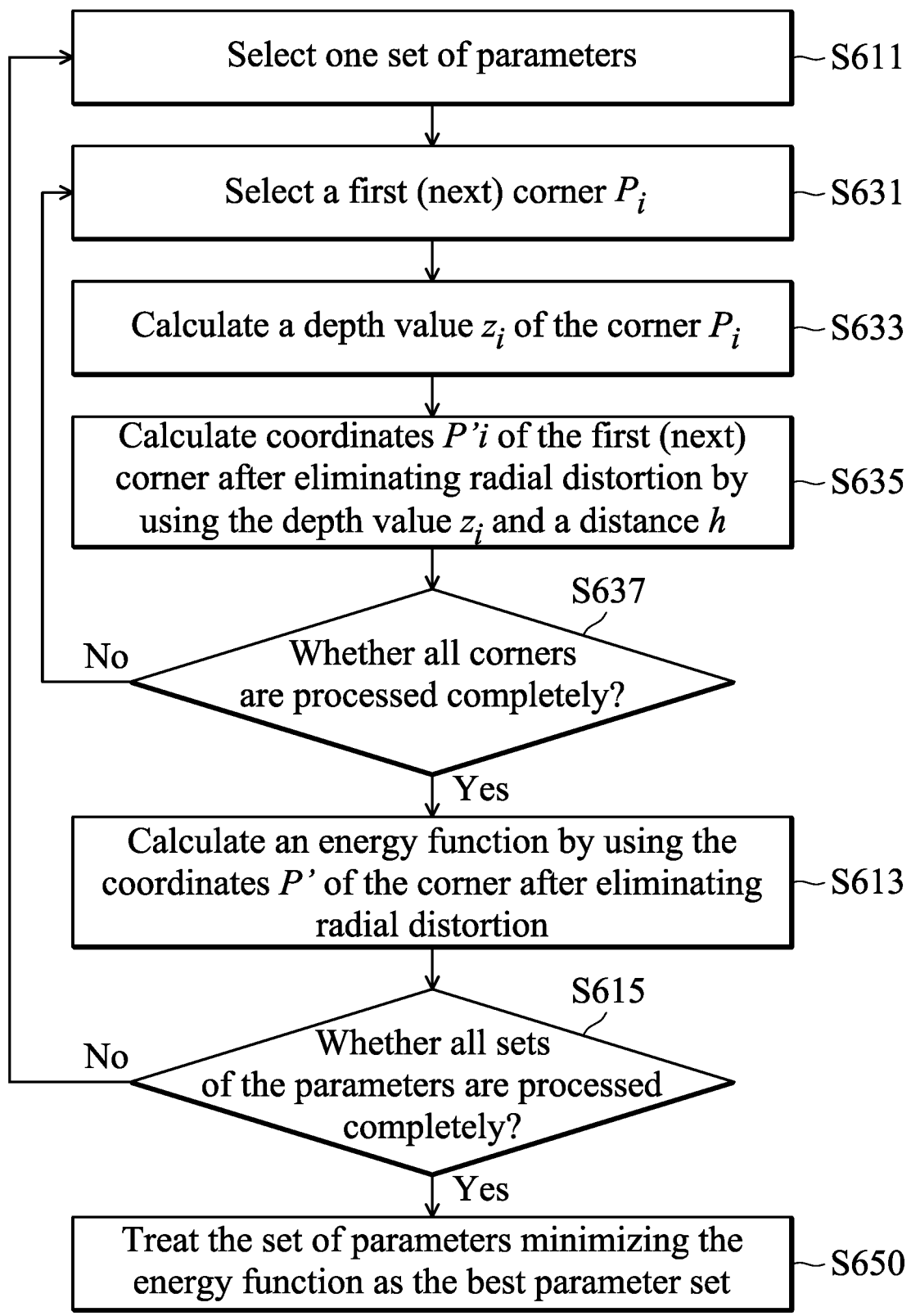
FIG. 6 is a flowchart illustrating a method for determining the best parameter set according to an embodiment of the invention.

In step S250, the processing unit 110 selects one set of parameters (which may be denoted as $\hat{\alpha}$ and $\hat{\beta}$) from multiple sets of parameters and calculates all corners of the shooting image 40 to generate an energy function by using the selected one set of parameters, i.e., best parameter set. The processing unit 110 subsequently generates more energy functions by using the other sets of parameters. When energy functions corresponding to all sets of parameters are generated completely, the set of parameter to minimize the energy function is treated as the best parameter set. Detailed calculations are described as follows: FIG. 6 is a flowchart illustrating a method for determining the best parameter set according to an embodiment of the invention. The method includes an outer loop (steps S611 to S615) and an inner loop (steps S631 to S637). In each iteration of the outer loop, the processing unit 110 selects one set of parameters from m sets of parameters $\alpha_j (c_j, p_j)^T$ and $\beta_j = (\beta 1_j, \beta 2_j, \beta 3_j)^T$, $0 \le j \le m-1$ (step S611), where m may be preset according to past experience. A first parameter α may simulate the surface of lens while a second parameter β may simulate the direction of the optical axis. Subsequently, the processing unit 110 repeatedly executes the inner loop to calculate the coordinates P' of n corners after eliminating radial distortion by using the selected set of parameters $\alpha_j$ and $\beta_j$ (steps S631 to S637). The processing unit 110 may sample n corners from all corners as shown in FIG. 5. For example, one column or/and one row of corners is/are selected as shown in FIG. 5. After the inner loop are performed completely, the processing unit 110 calculates an energy function corresponding to the selected set of parameters $\alpha_j$ and $\beta_j$ by using the coordinates P' of corners with eliminating radial distortion and the energy function may indicate the eliminated extent of the radial distortion of the shooting image 40 (step S613). When all sets of the first parameters α and the second parameters β are processed completely (the "Yes" path of step S615), the outer loop exits, the set of parameters minimizing the energy function is treated as the best parameter set and the best parameter set include the best first parameters $\hat{\alpha}$ and the best second parameters $\hat{\beta}$ (step S650).

In each iteration of the inner loop, the processing unit 110 selects a first (next) corner $P_i(x_i, y_i)$ from all corners as shown in FIG. 5, $0 \le i \le n-1$ (step S631), calculates the depth value $z_i$ of the corner $P_i$ by a surface equations based on the selected parameters $\alpha_j$ and $\beta_j$ (step S633) and calculates the coordinates $P'_i$ of the first (next) corner after eliminating radial distortion by using the depth value $z_i$ and a distance h between the camera module 190 and the checkerboard 30 (step S635). When all corners are processed completely (the "Yes" path of step S637), the inner loop ends.

In step S633, the depth value $z_i$ may be calculated by using the surface formulae as follows:

$$z'_i = c_j \times p_j - \frac{x'^2 + y'^2}{2p_j}$$

s.t.

$$[x', y', z'_i, 1] = [x_i, y_i, z_i, 1] \begin{bmatrix} \cos\beta 1_j & \sin\beta 1_j & 0 & 0 \\ -\sin\beta 1_j & \cos\beta 1_j & 0 & 0 \\ 0 & 0 & 1 & 0 \\ 0 & 0 & 0 & 1 \end{bmatrix}$$

-continued $$\begin{bmatrix} 1 & 0 & 0 & 0 \\ 0 & \cos\beta 2_j & \sin\beta 2_j & 0 \\ 0 & -\sin\beta 2_j & \cos\beta 2_j & 0 \\ 0 & 0 & 0 & 1 \end{bmatrix} \begin{bmatrix} \cos\beta 3_j & 0 & -\sin\beta 3_j & 0 \\ 0 & 1 & 0 & 0 \\ \sin\beta 3_j & 0 & \cos\beta 3_j & 0 \\ 0 & 0 & 0 & 1 \end{bmatrix},$$

where $z_i$ represents the depth value of the $i^{th}$ corner, $x_i$ represents the x-coordinate of the $i^{th}$ corner, $y_i$ represents the y-coordinate of the $i^{th}$ corner, $c_j$ and $p_j$ represent first parameters α of the $j^{th}$ set, and $\beta 1_j$, $\beta 2_j$ and $\beta 3_j$ represent second parameters β of the $j^{th}$ set.

In step S635, the coordinates $P'_i$ of the $i^{th}$ corner after eliminating radial distortion may be calculated by using the equation as follows:

$$P'_i = \left( \frac{h}{z_i} x_i, \frac{h}{z_i} y_i \right),$$

where $P'_i$ represents the coordinates $P'_i$ of the $i^{th}$ corner after eliminating radial distortion, h represents the distance between the camera module 190 and the checkerboard 30, $x_i$ represents the x-coordinate of the $i^{th}$ corner, $y_i$ represents the y-coordinate of the $i^{th}$ corner and $z_i$ represents the depth value of the $i^{th}$ corner.

In step S613, the energy function $E_j$ corresponding to the selected parameters $\alpha_j$ and $\beta_j$ may be calculated by using the equation as follows:

$$E_j = \Sigma_{k=1}^n \left( \left( \hat{x}_k - \frac{h}{z_k} x_k \right)^2 + \left( \hat{y}_k - \frac{h}{z_k} y_k \right)^2 \right);$$

and the coordinates $(\hat{x}_k, \hat{y}_k)$ of the $k^{th}$ corner after eliminating radial distortion may be calculated by using the equations as follows:

$$\hat{x}_k = \frac{\left( \frac{h}{z_{k+1}} x_{k+1} + \frac{h}{z_{k-1}} x_{k-1} \right)}{2};$$

$$\hat{y}_k = \frac{\left( \frac{h}{z_{k+1}} y_{k+1} + \frac{h}{z_{k-1}} y_{k-1} \right)}{2},$$

where h represents the distance between the camera module 190 and the checkerboard 30, $x_k$ represents the x-coordinate of the $k^{th}$ corner, $y_k$ represents the y-coordinate of the $k^{th}$ corner, $z_k$ represents the depth value of the $k^{th}$ corner, $x_{k-1}$ represents the x-coordinate of the $(k-1)^{th}$ corner, $y_{k-1}$ represents the y-coordinate of the $(k-1)^{th}$ corner, $z_{k-1}$ represents the depth value of the $(k-1)^{th}$ corner, $x_{k+1}$ represents the x-coordinate of the $(k+1)^{th}$ corner, $y_{k+1}$ represents the y-coordinate of the $(k+1)^{th}$ corner and $z_{k+1}$ represents the depth value of the $(k+1)^{th}$ corner. The locations of the $(k-1)^{th}$, $k^{th}$ and $(k+1)^{th}$ corners may be successive corners on the same line. Four exemplary cases of the successive corners are illustrated in FIG. 10. When the $k^{th}$ corner is located on edge, that is, the $(k-1)^{th}$ and/or $(k+1)^{th}$ corners/corner are/is absent, the coordinates $(\hat{x}_k, \hat{y}_k)$ of the $k^{th}$ corner are calculated as follows:

$$\hat{x}_k = \frac{h}{z_k} x_k; \text{ and}$$

$$\hat{y}_k = \frac{h}{z_k} y_k.$$

Figure 7:
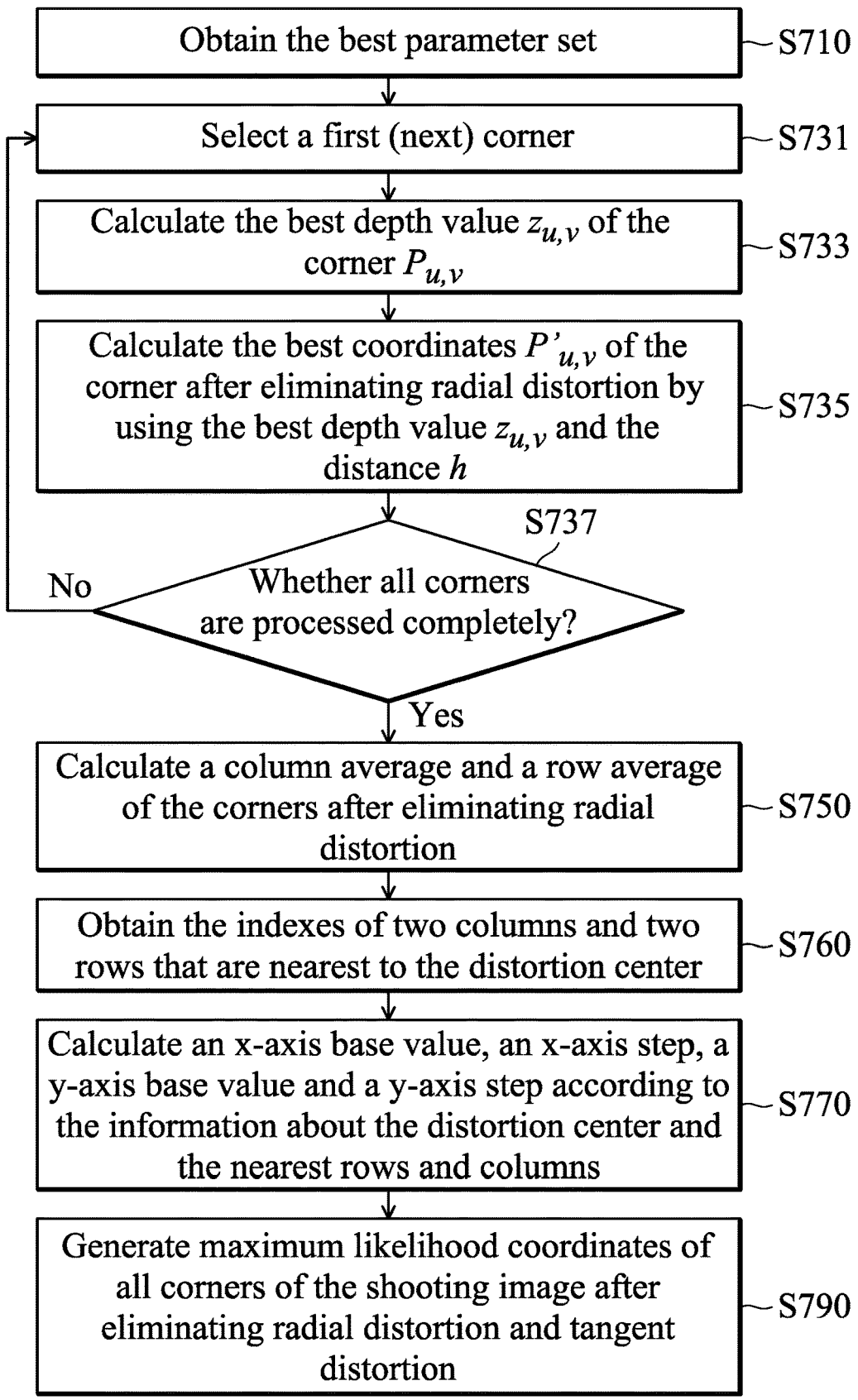
FIG. 7 is a flowchart illustrating a method for determining the maximum likelihood coordinates according to an embodiment of the invention.
Figure 8:
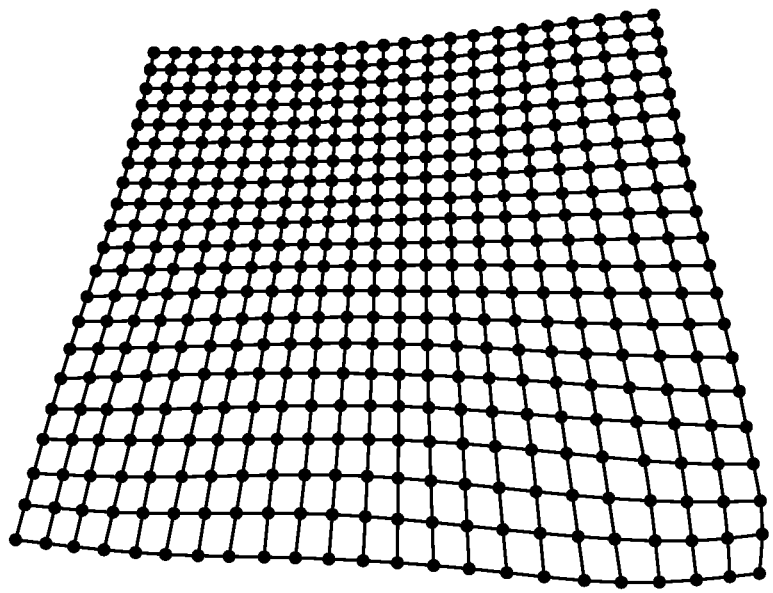
FIG. 8 is a schematic diagram illustrating the corners after eliminating radial distortion according to an embodiment of the invention.

In step S270, the processing unit 110 calculates the coordinates of the corners as shown in FIG. 5 after eliminating radial distortion by the surface equations based on the best parameters $\hat{\alpha}$ and $\hat{\beta}$ calculated in step S250, and applies the equal-length principle to the coordinates of the corners as shown in FIG. 5 after eliminating radial distortion to calculate the maximum likelihood coordinates $P_{u,v}^{UnDis}$ of the corners as shown in FIG. 5 after eliminating radial distortion and tangent distortion. Detailed calculations are described as follows: FIG. 7 is a flowchart illustrating a method for determining the maximum likelihood coordinates according to an embodiment of the invention. The processing unit 110 obtains the best parameter set including the best first parameters $\hat{\alpha}$ and the best second parameters $\hat{\beta}$, where $\hat{\alpha} = (\hat{c}, \hat{p})^T$ and $\hat{\beta} (\hat{\beta 1}, \hat{\beta 2}, \hat{\beta 3})^T$ (step S710), and repeatedly executes a loop for calculating the best coordinates $P'_{u,v}$ of all corners as shown in FIG. 5 after eliminating radial distortion by using the best parameter set $\hat{\alpha}$ and $\hat{\beta}$ (steps S731 to S737). In each iteration of the loop, the processing unit 110 selects a first (next) corner $P_{u,v} = (x_{u,v}, y_{u,v})$ from all corners as shown in FIG. 5, where $0 \le u \le U-1$, $0 \le v \le V-1$, U represents the total amount of rows of the corners and V represents the total amount of columns of the corners, $P_{u,v}$ represents the corner of the $u^{th}$ row of the $v^{th}$ column, $x_{u,v}$ represents the x-coordinate of the $u^{th}$ row of the $v^{th}$ column and $y_{u,v}$ represents the y-coordinate of the $u^{th}$ row of the $v^{th}$ column (step S731). Subsequently, the processing unit 110 calculates the best depth value $z_{u,v}$ of the corner $P_{u,v}$ by the surface equations based on the best parameters $\hat{\alpha}$ and $\hat{\beta}$ (step S733) and calculates the best coordinates $P'_{u,v}$ of the corner $P_{u,v}$ after eliminating radial distortion by using the best depth value $z_{u,v}$ and the distance h between the camera module 190 and the checkerboard 30 (step S735). When all corners are processed completely (the "Yes" path of step S737), the loop ends. FIG. 8 is a schematic diagram illustrating the corners after eliminating radial distortion according to an embodiment of the invention.

In step S733, the depth value $z_{u,v}$ of the corner $P_{u,v}$ may be calculated by using the surface equations as follows:

$$z'_{u,v} = \hat{c} \times \hat{p} - \frac{x'^2 + y'^2}{2\hat{p}}$$

s.t.

$$[x', y', z'_{u,v}, 1] = [x_{u,v}, y_{u,v}, z_{u,v}, 1] \begin{bmatrix} \cos\hat{\beta 1} & \sin\hat{\beta 1} & 0 & 0 \\ -\sin\hat{\beta 1} & \cos\hat{\beta 1} & 0 & 0 \\ 0 & 0 & 1 & 0 \\ 0 & 0 & 0 & 1 \end{bmatrix}$$

$$\begin{bmatrix} 1 & 0 & 0 & 0 \\ 0 & \cos\hat{\beta 2} & \sin\hat{\beta 2} & 0 \\ 0 & -\sin\hat{\beta 2} & \cos\hat{\beta 2} & 0 \\ 0 & 0 & 0 & 1 \end{bmatrix} \begin{bmatrix} \cos\hat{\beta 3} & 0 & -\sin\hat{\beta 3} & 0 \\ 0 & 1 & 0 & 0 \\ \sin\hat{\beta 3} & 0 & \cos\hat{\beta 3} & 0 \\ 0 & 0 & 0 & 1 \end{bmatrix}$$

where $z_{u,v}$ represents the depth value of the corner of the $u^{th}$ row of the $v^{th}$ column, $x_{u,v}$ represents the x-coordinate of the corner of the $u^{th}$ row of the $v^{th}$ column, $y_{u,v}$ represents the y-coordinate of the corner of the $u^{th}$ row of the $v^{th}$ column, $\hat{\alpha}$ and $\hat{\beta}$ represent the best parameter set, $\hat{\alpha} = (\hat{c}, \hat{p})^T$ and $\hat{\beta} = (\hat{\beta}1, \hat{\beta}2, \hat{\beta}3)^T$.

In step S735, the coordinates $P'_{u,v}$ of the corner $P_{u,v}$ after eliminating radial distortion may be calculated by using the equation as follows:

$$P'_{u,v} = \left( \frac{h}{z_{u,v}} x_{u,v}, \frac{h}{z_{u,v}} y_{u,v} \right),$$

where $P'_{u,v}$ represents the best coordinates after eliminating radial distortion of the corner $P_{u,v}$, i.e., the corner of the $u^{th}$ row of the $v^{th}$ column, h represents the distance between the camera module 190 and the checkerboard 30, $x_{u,v}$ represents the x-coordinate of the corner of the $u^{th}$ row of the $v^{th}$ column, $y_{u,v}$ represents the y-coordinate of the corner of the $u^{th}$ row of the $v^{th}$ column, and $z_{u,v}$ represents the best depth value of the corner of the $u^{th}$ row of the $v^{th}$ column.

Figure 9:
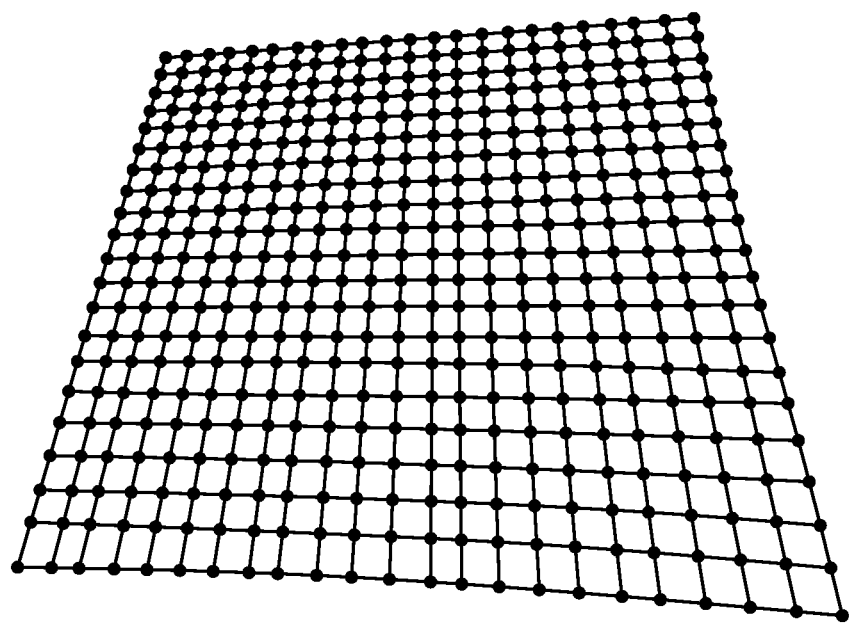
FIG. 9 is a schematic diagram illustrating the corners after eliminating tangent distortion according to an embodiment of the invention.

After the radial distortion has been eliminated from the detected corners (that is, for example, after the corners as shown in FIG. 8 are obtained), the processing unit 110 calculates a column average $x'_v$ and a row average $y'_u$ of the corners after eliminating radial distortion (step S750), obtains the indexes index_x1 and index_x2 of two columns and the indexes index_y1 and index_y2 of two rows that are nearest to a distortion center $(x_e, y_e)$, where the distortion center $(x_e, y_e)$ may be calculated in step S230 (step S760), calculates an x-axis base value $x_{base}$, an x-axis step $x_{step}$, a y-axis base value $y_{base}$ and a y-axis step $y_{step}$ according to the distortion center $(x_e, y_e)$ and the nearest rows and columns (step S770), and generates maximum likelihood coordinates $P_{u,v}^{UnDis}$ of all corners of the shooting image 40 after eliminating radial distortion and tangent distortion accordingly (step S790). FIG. 9 is a schematic diagram illustrating the corners after eliminating radial distortion and tangent distortion according to an embodiment of the invention. It should be noted that the corners as shown in FIG. 9 looks skewed because the optical axis is not placed vertical to the checkerboard. When the optical axis is placed substantially vertical to the checkerboard, the skew of FIG. 9 may be disappear or unobvious.

In step S750, the column average $x'_v$ and the row average $y'_u$ of the corners after eliminating radial distortion may be calculated by using the equations as follows:

$$x'_v = \frac{1}{U} \Sigma_{u=0}^{U-1} x'_{u,v};$$

$$y'_u = \frac{1}{V} \Sigma_{v=0}^{V-1} y'_{u,v},$$

where U represents the total amount of rows of the corners, V represents the total amount of columns of the corners, $x'_{u,v}$ represents the x-coordinate of the $u^{th}$ row of the $v^{th}$ column of the corners after eliminating radial distortion, and $y'_{u,v}$ represents the y-coordinate of the $u^{th}$ row of the $v^{th}$ column of the corners after eliminating radial distortion.

In step S760, the indexes index_x1, index_x2 index_y1 and index_y2 may be calculated by using the equations as follows:

$$(x'_{index_{x1}} - x_e)^2 = \min(x'_v - x_e)^2, 0 \leq v \leq V-1;$$

$$(x'_{index_{x2}} - x_e)^2 = \min(x'_v - x_e)^2, 0 \leq v \leq V-1, \ index_{x1} \notin v;$$

$$(y'_{index_{y1}} - y_e)^2 = \min(y'_u - y_e)^2, 0 \leq u \leq U-1;$$

$$(y'_{index_{y2}} - x_e)^2 = \min(y'_u - y_e)^2, 0 \leq u \leq U-1, \ index_{y1} \notin u,$$

where $x_e$ represents the x-coordinate of the distortion center, $y_e$ represents the y-coordinate of the distortion center, U represents the total amount of rows of the corners, V represents the total amount of columns of the corners, $x'_v$ represents an average of the x-coordinates of the $v^{th}$ column of the corners after eliminating radial distortion, $y'_u$ represents an average of the y-coordinates of the $u^{th}$ row of the corners after eliminating radial distortion, $x'_{index_{x1}}$ represents an average of the x-coordinates of the (index_x1)$^{th}$ column of the corners after eliminating radial distortion, $x'_{index_{x2}}$ represents an average of the x-coordinates of the (index_x2)$^{th}$ column of the corners after eliminating radial distortion, $y'_{index_{y1}}$ represents an average of the y-coordinates of the (index_y1)$^{th}$ row of the corners after eliminating radial distortion, and $y'_{index_{y2}}$ represents an average of the y-coordinates of the (index_y2)$^{th}$ row of the corners after eliminating radial distortion.

In the step S770, an x-axis base value $x_{base}$, an x-axis step $x_{step}$, a y-axis base value $y_{base}$ and a y-axis step $y_{step}$ and the x-axis base value $x_{base}$ are calculated, wherein the $x_{base}$ indicates an average of x-coordinates of one column (e.g., labeled with index_x1 or index_x2) that is nearest to the distortion center, the $y_{base}$ indicates an average of y-coordinates of one row (e.g., labeled with index_y1 or index_y2) that is nearest to the distortion center, the $x_{step}$ indicates the difference between the averaged x-coordinates of two columns (e.g., labeled with index_x1 and index_x2) that are nearest to the distortion center, and the $y_{step}$ indicates the difference between the averaged y-coordinates of two rows (e.g., labeled with index_y1 and index_y2) that are nearest to the distortion center. It should be noted that the columns index_y1 and index_y2 and the rows index_x1 and index_x2 include corners after eliminating radial distortion. In an embodiment, the x-axis base value $x_{base}$, the x-axis step $x_{step}$, the y-axis base value $y_{base}$ and the y-axis step $y_{step}$ may be calculated by using the equations as follows:

$$x_{base} = x'_{index_{x1}};$$

$$x_{step} = x'_{index_{x1}} - x'_{index_{x2}};$$

$$y_{base} = y'_{index_{y1}};$$

$$y_{step} = y'_{index_{y1}} - y'_{index_{y2}},$$

where $x'_{index_{x1}}$ represents the average of the x-coordinates of the corners of the (index_x1)$^{th}$ column after eliminating radial distortion, $x'_{index_{x2}}$ represents the average of the x-coordinates of the corners of the (index_x2)$^{th}$ column with eliminating radial distortion, $y'_{index_{y1}}$ represents the average of the y-coordinates of the corners of the (index_y1)$^{th}$ row with eliminating radial distortion, and $y'_{index_{y2}}$ represents the average of the y-coordinates of the corners of the (index_y2)$^{th}$ row after eliminating radial distortion.

In step S790, the maximum likelihood coordinates $P_{u,v}^{Un\_Dis}$ of all corners of the shooting image 40 after eliminating radial distortion and tangent distortion may be calculated by using the equations as follows:

$$x_{index_{x1}+r}^{UnDis}=x_{base}+r\times x_{step}, \text{ if index\_x1<index\_x2};$$

$$x_{index_{x1}+r}^{UnDis}=x_{base}+r\times x_{step}, \text{ if index\_x1>index\_x2};$$

$$y_{index_{y1}+s}^{UnDis}=y_{base}+r\times y_{step}, \text{ if index\_y1<index\_y2};$$

$$y_{index_{y1}+s}^{UnDis}=y_{base}+r\times y_{step}, \text{ if index\_y1>index\_y2};$$

and the ranges of r and s may be expressed as follows:

$$\text{index\_x1} \leq r \leq V-1-\text{index\_x1};$$

$$\text{index\_y1} \leq s \leq U-1-\text{index\_y1},$$

where $x_{index_{x1}+r}^{UnDis}$ indicates an x-coordinate of the corners of the (index_x1+r)$^{th}$ column after eliminating radial distortion and tangent distortion, $y_{index_{y1}+s}^{UnDis}$ indicates a y-coordinate of the corners of the (index_y1+s)$^{th}$ row after eliminating radial distortion and tangent distortion, U represents the total amount of rows of the corners, and V represents the total amount of columns of the corners.

In step S280, those skilled in the art may use well-known methods (such as, interpolation method) to calculate maximum likelihood coordinates $P_{u,v}^{UnDis}$ corresponding to all pixels except for the corners as shown in FIG. 9.

In step S290, the non-volatile storage device 160 may be a flash memory or any storage device that the lookup table cannot be lost when power down or sudden power off. The lookup table contains multiple entries. The total number and organization of entries are related with the number and positions of the image sensors of an image sensor array. For example, when the image sensor array contains m×n image sensors, the lookup table contains m×n entries, where m and n are integers greater than 0, and m and n may be the same or different. Each entry stores information about a reference position for one pixel of the shooting image. Assuming the entry [i,j] stores [k,l]: Specifically, when the entry [i,j] is one corner determined in step S230, [k,l] stores information about maximum likelihood coordinates of the corner after eliminating radial distortion and tangent distortion, where the maximum likelihood coordinates of the corner are calculated in step S270. When the entry [i,j] is not one corner determined in step S230, [k,l] stores information about maximum likelihood coordinates of this pixel after eliminating radial distortion and tangent distortion, where the maximum likelihood coordinates of this pixel are calculated in step S280. In some embodiments, the information stored in the entry [i,j] may indicate that the reference position of the pixel [i,j] of the shooting image is [k,l], where i and k are any arbitrary integers ranging from 0 to m−1, and j and l are any arbitrary integers ranging from 0 to n−1. In some embodiments, the information stored in the entry [i,j] may indicate that the reference position of the pixel [i,j] of the shooting image is [i+k,j+l], where i is an any arbitrary integer ranging from 0 to m−1, k is an any arbitrary integer (a positive integer, 0 or a negative integer), i+k is limited in an integer ranging from 0 to m−1, j is an any arbitrary integer ranging from 0 to n−1, l is an any arbitrary integer (a positive integer, 0 or a negative integer), j+l is limited in an integer ranging from 0 to n−1. In some embodiments, for reducing the storage space, the lookup table may store information about the maximum likelihood coordinates of the only corners determined in step S230 after eliminating radial distortion and tangent distortion. In some embodiments, for reducing the storage space, the lookup table may store information about the best coordinates of the only corners determined in step S735 after eliminating radial distortion.

After the camera module 190 leaves the factory, the processing unit 110 may obtain an original image from the camera module 190 and generates an adjusted image according to information about reference position of the lookup table stored in the non-volatile storage device 160. It should be noted that the information about the reference position includes position information for the pixels after eliminating distortion. In an example, the processing unit 110 may acquire a value of the pixel [k,l] of the original image as a value of the pixel [i,j] of the adjusted image. In another example, the processing unit 110 may acquire a value of the pixel [i+k,j+l] of the original image as a value of the pixel [i,j] of the adjusted image. In still another example, the processing unit 110 may obtain value of the pixel [i,j] of the adjusted image by using a smoothing algorithm based on the calculation of values of the pixel [k,l] and its neighboring pixels of the original image. In still another example, the processing unit 110 may obtain value of the pixel [i,j] of the adjusted image by using a smoothing algorithm based on the calculation of values of the pixel [i+k,j+l] and its neighboring pixels of the original image. It should be understood that the adjusted image may be generated off-line.

From an perspective of the invention, the processing unit 110 drives the camera module controller 170 to control the camera module 190 to shoot the checkerboard 30 obtain the shooting image 40 with distortion; eliminates the distortion from the shooting image to generate information about reference position of pixels of the shooting image 40; and stores a lookup table in the non-volatile storage device 160. It should be noted that the information about the reference position includes position information of the pixels after eliminating distortion. In alternative implementations, the processing unit 110 generates an adjustment model according to the adjusted images, the adjustment model includes mathematical equations or algorithms with relevant parameters, so as to reduce distortion of an original image. However, it should be noted that, when the distortion of the original image imaged acquired from an image sensor array is difficult to be simulated by using mathematical equations or algorithms with relevant parameters, the adjustment model cannot be used to eliminate the distortion of the original image effectively. Unlike the aforementioned implementations, a lookup table of an embodiment of the invention contains multiple entries and each entry stores information about a reference position of one pixel, so as to overcome the aforementioned limitation.

From another perspective of the invention, the processing unit 110 adjusts the original image in two phases: determining best parameter set of the camera module 190 according to information of corners of the shooting image 40 (phase one); and, obtaining maximum likelihood coordinates of the pixels of the shooting image after eliminating distortion according to the best parameter set and a distortion center (phase two). Finally, the processing unit 110 stores a lookup table in the non-volatile storage device 160, where the lookup table includes information about the maximum likelihood coordinates of the corners after eliminating distortion. From another perspective of the invention, the processing unit 110 uses the following method to obtain the maximum likelihood coordinates of the corners after eliminating distortion: obtaining maximum likelihood coordinates of the corners of a shooting image after eliminating distortion according to best parameters and a distortion center; and obtaining maximum likelihood coordinates of pixels after eliminating distortion except for the corners of the shooting image by using the maximum likelihood coordinates of the corners. In alternative implementations, a multiple images by shooting a checkerboard in different angles may be captured to generate an adjustment model according to corners and distortion centers of the captured images, the adjustment model includes mathematical equations or algorithms with relevant parameters. Unlike the aforementioned implementations, the two-phase adjustment of an embodiment of the invention can shoot the checkerboard 30 only once to obtain maximum likelihood coordinates of all pixels of the shooting image 40 after eliminating distortion.

Although the embodiment has been described in FIG. 1 as having specific elements, it should be noted that additional elements may be included to achieve better performance without departing from the spirits of the invention. While the processing flows described in FIGS. 2, 7 and 8 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for camera calibration, performed by a processing unit, comprising:
providing a plurality of parameter sets;
controlling a camera module to obtain a shooting image with a distortion;
determining a plurality of corners of the shooting image according to a plurality of pixels of the shooting image;
determining a best parameter set of the camera module according to information about the corners, wherein the best parameter set is one of the plurality of parameter sets;
determining a plurality of maximum likelihood coordinates of the plurality of pixels after eliminating the distortion according to the best parameter set and a distortion center; and
adjusting an output from the camera module according to the maximum likelihood coordinates;
wherein each parameter set of the plurality of parameter sets comprises a first parameter and a second parameter, the first parameter simulates a surface of a lens and the second parameter simulates a direction of an optical axis.

2. The method of claim 1, wherein the distortion comprises a radial distortion, the best parameter set is determined according to an energy function, and the energy function indicates the eliminated extent of the radial distortion of the shooting image.

3. The method of claim 2, comprising:
generating a plurality of energy functions corresponding to the plurality of parameter sets;
treating a set of parameter minimize the energy function as the best parameter set; and
obtaining the best coordinates of the plurality of corners after eliminating the distortion by using the best parameter set.

4. The method of claim 1, wherein the best parameter set comprises a first best parameter and a second best parameter, the first best parameter simulates a surface of a lens and the second best parameter simulates a direction of an optical axis.

5. The method of claim 1, comprising:
determining a plurality of best coordinates of the plurality of corners after eliminating a radial distortion; and
determining a plurality of maximum likelihood coordinates of the plurality of corners after eliminating a tangent distortion according to the best coordinates and the distortion center.

6. The method of claim 5, comprising:
calculating a plurality of column averages and a plurality of row averages of the corners according to the best coordinates, so as to determine two columns and two rows being nearest to the distortion center;
determining a base value and a step according to the column averages of the two nearest columns and the row averages of the two nearest rows; and
generating the maximum likelihood coordinates of the plurality of corners after eliminating the radial distortion and the tangent distortion according to the base value and the step.

7. The method of claim 1, comprising:
generating reference position information of the plurality of corners of the shooting image according to the maximum likelihood coordinates of the plurality of corners after eliminating the distortion;
storing the reference position information in a lookup table; and
adjusting the output from the camera module by using the lookup table.

8. A method for camera calibration, performed by a processing unit, comprising:
providing a plurality of parameter sets;
controlling a camera module to obtain a shooting image with a distortion;
determining a plurality of corners of the shooting image according to a plurality of pixels of the shooting image;
determining a best parameter set of the camera module according to information about the corners, wherein the best parameter set is one of the plurality of parameter sets, wherein the best parameter set minimize an energy function; and
adjusting an output from the camera module according to the best parameter set;
wherein each parameter set of the plurality of parameter sets comprises a first parameter and a second parameter, the first parameter simulates a surface of a lens and the second parameter simulates a direction of an optical axis.

9. The method of claim 8, wherein the best parameter set is determined by the energy function and the energy function is determined according to depth values of the corners and a distance between the camera module and a checkerboard.

10. The method of claim 8, comprising:
generating a plurality of energy functions corresponding to the plurality of parameter sets; and
obtaining a plurality of best coordinates of the plurality of corners after eliminating distortion by using the best parameter set, wherein the distortion comprises a radial distortion.

11. The method of claim 10, wherein the best coordinates of the plurality of corners are calculated using an equation:

$$P'_{u,v} = \left( \frac{h}{z_{u,v}} x_{u,v}, \frac{h}{z_{u,v}} y_{u,v} \right),$$

wherein $P'_{u,v}$ represents the best coordinates of the corner of the $u^{th}$ row of the $v^{th}$ column after eliminating a radial distortion, h represents the distance between the camera module and the checkerboard, $x_{u,v}$ represents an x-coordinate of the corner of the $u^{th}$ row of the $v^{th}$ column, $y_{u,v}$ represents a y-coordinate of the corner of the $u^{th}$ row of the $v^{th}$ column, and $z_{u,v}$ represents a best depth value of the corner of the $u^{th}$ row of the $v^{th}$ column.

12. The method of claim 8, wherein the energy function is calculated using equations:

$$E_j = \sum_{k=1}^{n} \left( \left( \hat{x}_k - \frac{h}{z_k} x_k \right)^2 + \left( \hat{y}_k - \frac{h}{z_k} y_k \right)^2 \right);$$

$$\hat{x}_k = \frac{\left( \frac{h}{z_{k+1}} x_{k+1} + \frac{h}{z_{k-1}} x_{k-1} \right)}{2};$$

$$\hat{y}_k = \frac{\left( \frac{h}{z_{k+1}} y_{k+1} + \frac{h}{z_{k-1}} y_{k-1} \right)}{2},$$

where h represents the distance between the camera module and the checkerboard, $x_k$ represents an x-coordinate of the $k^{th}$ corner, $y_k$ represents a y-coordinate of the $k^{th}$ corner, $z_k$ represents a depth value of the $k^{th}$ corner, $x_{k-1}$ represents an x-coordinate of the $(k-1)^{th}$ corner, $y_{k-1}$ represents a y-coordinate of the $(k-1)^{th}$ corner, $z_{k-1}$ represents a depth value of the $(k-1)^{th}$ corner, $x_{k+1}$ represents an x-coordinate of the $(k+1)^{th}$ corner, $y_{k+1}$ represents a y-coordinate of the $(k+1)^{th}$ corner and $z_{k+1}$ represents a depth value of the $(k+1)^{th}$ corner.

13. The method of claim 8, comprising:
generating reference position information of the plurality of corners of the shooting image according to the best parameter set;
storing the reference position information in a lookup table; and
adjusting the output from the camera module by using the lookup table.

14. The method of claim 8, comprising:
obtaining the best coordinates of the plurality of corners after eliminating a radial distortion according to the best parameter set; and
obtaining a plurality of maximum likelihood coordinates of the plurality of corners after eliminating a tangent distortion.

15. The method of claim 14, comprising:
calculating a plurality of column averages and a plurality of row averages of the corners according to the best coordinates, so as to determine two columns and two rows being nearest to the distortion center;
determining a base value and a step according to the column averages of the two nearest columns and the row averages of the two nearest rows; and
generating the maximum likelihood coordinates of the plurality of corners after eliminating the radial distortion and the tangent distortion according to the base and the step.

16. The method of claim 14, comprising:
generating reference position information of the plurality of corners of the shooting image according to the maximum likelihood coordinates;
storing the reference position information in a lookup table; and
adjusting the output from the camera module by using the lookup table.

17. A method for camera calibration, performed by a processing unit, comprising:
providing a plurality of parameter sets;
controlling a camera module to obtain a shooting image with a distortion;
generating reference position information of a plurality of pixels of the shooting image based on a best parameter set, wherein the reference position information includes position information of the plurality of pixels after eliminating the distortion, wherein the best parameter set is one of the plurality of parameter sets;
storing the reference position information in a lookup table, wherein the lookup table comprises a plurality of entries and each entry stores reference position of one pixel; and
adjusting an output from the camera module by using the lookup table;
wherein each parameter set of the plurality of parameter sets comprises a first parameter and a second parameter, the first parameter simulates a surface of a lens and the second parameter simulates a direction of an optical axis.

18. The method of claim 17, wherein the distortion comprises a radial distortion and the position information comprises best coordinates of pixels after eliminating the radial distortion.

19. The method of claim 17, comprising:
determining a plurality of corners of the shooting image according to the pixels of the shooting image;
determining the best parameter set corresponding to the camera module according to information of the corners; and
determining the reference position information based on the best parameter set.

20. The method of claim 19, wherein the best parameter set is determined by an energy function and the energy function is determined according to depth values of the corners and a distance between the camera module and a checkerboard.

21. The method of claim 17, comprising:
generating a plurality of energy functions corresponding to the plurality of parameter sets; and
treating a set of parameter minimize the energy function as the best parameter set.

22. The method of claim 17, wherein the distortion comprises a tangent distortion and the position information comprises maximum likelihood coordinates of pixels after eliminating the tangent distortion.

23. The method of claim 22, comprising:
determining a plurality of corners of the shooting image according to the plurality of pixels of the shooting image;
determining a plurality of best coordinates of the plurality of corners after eliminating a radial distortion; and
determining a plurality of maximum likelihood coordinates of the plurality of corners after eliminating the tangent distortion according to the best coordinates and a distortion center.

24. The method of claim 22, comprising:
- determining a plurality of corners of the shooting image according to the plurality of pixels of the shooting image; and
- applying an equal-length principle to the corners of the shooting image to eliminate the tangent distortion, wherein the equal-length principle defines that the distances between the last corner and this corner and between the next corner and this corner are same.

25. The method of claim 17, comprising:
- determining a plurality of corners of the shooting image according to the plurality of pixels of the shooting image;
- obtaining a plurality of maximum likelihood coordinates of the plurality of corners after eliminating the distortion; and
- obtaining a plurality of maximum likelihood coordinates of the plurality of pixels of the shooting image after eliminating distortion according to the plurality of maximum likelihood coordinates of the plurality of corners.

26. The method of claim 17, wherein the lookup table comprises m×n entries, m and n are integers greater than 0, the entry [i,j] stores [k,l] to indicate that the reference position of the pixel [i,j] of the shooting image is [k,l], i and k are any arbitrary integers ranging from 0 to m−1, and j and l are any arbitrary integers ranging from 0 to n−1.

27. The method of claim 17, comprising:
- obtaining an original image from the camera module after the camera module leaves a factory; and
- generating an adjusted image according to the reference position information stored in the lookup table.

* * * * *